(12) United States Patent
Geukens

(10) Patent No.: US 8,233,365 B1
(45) Date of Patent: Jul. 31, 2012

(54) METHODS AND APPARATUSES FOR DETECTING A MODULATION TRANSITION IN AN OPTICAL STORAGE MEDIUM

(75) Inventor: Tom Geukens, Boulder, CO (US)

(73) Assignee: Marvell International Ltd., Hamilton (BM)

(*) Notice: Subject to any disclaimer, the term of this patent is extended or adjusted under 35 U.S.C. 154(b) by 630 days.

(21) Appl. No.: 12/036,137

(22) Filed: Feb. 22, 2008

Related U.S. Application Data

(60) Provisional application No. 60/891,858, filed on Feb. 27, 2007.

(51) Int. Cl.
- G11B 27/36 (2006.01)
- G11B 7/00 (2006.01)
- G11B 20/00 (2006.01)
- G11B 3/00 (2006.01)
- G11B 3/74 (2006.01)

(52) U.S. Cl. ............ 369/53.23; 369/53.28; 369/124.04; 369/44.13; 369/47.19; 369/61; 369/90; 369/107

(58) Field of Classification Search ............. 369/124.04, 369/44.13, 47.19, 53.28, 61, 62, 90, 107
See application file for complete search history.

(56) References Cited

U.S. PATENT DOCUMENTS

| | | | | |
|---|---|---|---|---|
| 5,592,463 | A * | 1/1997 | Muramatsu et al. | 369/47.53 |
| 2001/0038604 | A1 * | 11/2001 | Sato et al. | 369/275.4 |
| 2002/0110080 | A1 * | 8/2002 | Tanaka et al. | 369/275.4 |
| 2002/0159347 | A1 * | 10/2002 | Sasaki et al. | 369/44.37 |
| 2003/0179673 | A1 * | 9/2003 | Shimada et al. | 369/53.19 |
| 2004/0170093 | A1 * | 9/2004 | Kamiya | 369/44.25 |
| 2006/0077805 | A1 * | 4/2006 | Suzuki | 369/44.27 |
| 2007/0091754 | A1 * | 4/2007 | Ishikawa | 369/53.22 |
| 2008/0112288 | A1 * | 5/2008 | Miyashita et al. | 369/53.2 |

* cited by examiner

*Primary Examiner* — Joseph Feild
*Assistant Examiner* — Aneeta Yodichkas

(57) ABSTRACT

Circuits, architectures, systems, methods, software, and algorithms for detecting a modulation transition (e.g., a change from a written portion containing RF-modulated data to an unwritten portion containing only a wobble signal modulation) on an optical storage medium. The method generally includes steps of focusing a first spot of light onto an optical storage medium, wherein the first spot is substantially centered on a first track of the optical storage medium, focusing a satellite spot of light onto an optical storage medium, wherein the satellite spot at least partially overlaps a track adjacent to the first track, generating a satellite signal from light reflected from the optical storage medium from the satellite spot, and detecting the modulation transition by detecting a change in a level of the satellite signal. The present invention advantageously provides for detecting a modulation transition between a main (current) track and an adjacent (next) track, so that demodulation of a signal from an optical storage medium can be smoothly switched from one mode to another.

24 Claims, 8 Drawing Sheets

METHODS AND APPARATUSES FOR DETECTING A MODULATION TRANSITION IN AN OPTICAL STORAGE MEDIUM

RELATED APPLICATIONS

This application claims the benefit of U.S. Provisional Application No. 60/891,858, filed Feb. 27, 2007, incorporated herein by reference in its entirety.

FIELD

The present invention generally relates to the field of optical storage media. More specifically, embodiments of the present invention pertain to methods and apparatuses for detecting modulation transitions between tracks of an optical disc.

BACKGROUND

To allow optical drives to accurately process blank (i.e. unwritten) recordable optical media, recordable optical media are manufactured with one or more detectable characteristics to provide optical drives with tracking, timing and absolute (as opposed to merely relative) addresses. Recordable optical media such as Compact Disc-Recordable (CD-R), Digital Versatile Disc-Recordable (DVD-R), Blu-Ray Disc-Recordable (BD-R), etc., generally comprise one or more sides having one or more layers with a continuous spiral track formed by a continuous radiating spiral pre-groove (or channel) that is separated by a continuous radiating spiral land (or mesa). Depending on the particular optical media, data may be stored in or on the groove(s) and/or land(s). Other media may comprise concentric circular, as opposed to continuous spiral, tracks.

The pre-groove is a detectable characteristic that supports tracking. Another detectable characteristic common to most recordable optical media is a periodic deviation of the pre-groove from a perfect spiral, or circle, which is referred to as a wobble. The wobble supports timing, but may also support absolute addressing. Depending on the type of media, the wobble may be fixed or modulated. The modulation of the wobble supports absolute timing or addressing. Alternatively, fixed wobbles may be accompanied by other detectable characteristics such as land pre pits (LPPs) in support of absolute timing or addressing.

An optical pick-up unit (OPU) in an optical drive detects and uses the fixed or modulated wobbled spiral track of recordable optical media to generate a wobble signal, perhaps along with other signals related to other detectable characteristics. The wobble signal and/or alternate or additional signals are used to produce Absolute Time In Pre-groove (ATIP) and/or Address in Pre-groove (ADIP) data for optical drives. ATIP and/or ADIP data is used by optical drives to spin optical media at a constant linear velocity (CLV) and precisely determine the position of their OPU along the track on the media either by sector or time.

ATIP and/or ADIP data is also used by optical recorder drives to synchronize data recorded on optical media with the wobble or other characteristic(s). As such, during playback (i.e. reading) of recorded optical media in an optical drive, the wobble or other characteristic is not required as a separate signal for an optical drive to maintain timing or addressing because the recorded data provides the same information as the wobble signal. However, for blank areas of optical media, the wobble or other characteristic remains the only indication of timing and addressing.

Thus, in order to continuously maintain timing and position in recordable media having both written and blank areas, the optical drive may need to switch back and forth between processing the wobble signal and the recorded data. An unexpected transition between written and blank areas on optical media may, as in the case of an optical drive having only one channel, result in a read error in the optical drive, causing a time-consuming read-retry to regain a lock on timing and position. Transitions between written and blank areas may also contribute to inaccurate tracking or radial error (i.e. REN) signals. Transitions may also contribute to inaccurate gain control (e.g., saturation due to excessive amplification of blank areas).

Therefore, it would be advantageous to detect modulation transitions in an optical storage medium to avoid time-consuming read-retry's, inaccurate tracking and/or over/under amplification due to unannounced transitions between written and blank areas on optical media.

SUMMARY

Embodiments of the present invention include circuitry, architectures, systems, methods, software, and algorithms for detecting a modulation transition (e.g., a change from a written portion containing RF-modulated data to an unwritten portion containing only a wobble signal modulation) on an optical storage medium. The method generally includes steps of focusing a first spot of light onto an optical disc, wherein the first spot is substantially centered on a first track of the optical disc, focusing a satellite spot of light onto an optical disc, wherein the satellite spot at least partially overlaps a track adjacent to the first track, generating a satellite signal from light reflected from the optical disc from the satellite spot, and detecting the modulation transition by detecting a change in a level of the satellite signal.

In a further embodiment, generating the satellite signal includes detecting the light reflected from the optical discs from the satellite spot and producing the satellite signal in response to the detecting. For example, detecting the light may comprise directing the reflected light to one or more satellite photodetectors (e.g., photodiodes). In a still further embodiment, generating the satellite signal may comprise combining signals from each of the satellite photodetectors (e.g., the satellite signal may comprise a sum of detector signals).

In another embodiment, the modulation transition comprises a change from an unwritten region of the optical storage medium to a written region of the optical storage medium when the satellite signal changes from a low level to a high level (e.g., because less light is reflected from the adjacent track when it contains written data). Thus, the modulation transition may also comprise a change from a written region of the optical storage medium to an unwritten region of the optical storage medium when the satellite signal changes from a high level to a low level. In some optical disc formats (e.g., Blu-ray Disc Recordable Format Ver.1.2) the written areas are higher in reflectivity than the unwritten regions. Thus, in alternate embodiments the modulation transition may comprise a change from a written region of the optical storage medium to an unwritten region of the optical storage medium when the satellite signal changes from a low level to a high level.

In another embodiment, the method further includes steps generating a main signal from light reflected from the optical disc from the first spot, demodulating a data signal from the main signal when the first track comprises a written region of the optical storage medium, and demodulating a wobble signal from the main signal when the first track comprises an unwritten region of the optical storage medium. Thus, the method may comprise switching from demodulating the data signal to demodulating the wobble signal when the satellite signal changes from a low level to a high level and/or switching from demodulating the wobble signal to demodulating the data signal when the satellite signal changes from a high level to a low level.

Further embodiments relate to a controller (e.g., comprising a general purpose microprocessor, a system-on-chip [SOC] device, and/or an application specific integrated circuit [ASIC]) in an optical storage device. The controller is generally configured to receive a main signal, wherein the main signal generated from light reflected from an optical disc from a first spot a first spot of light, wherein the first spot is substantially centered on a first track of the optical disc, receive a satellite signal, wherein the satellite signal is generated from light reflected from the optical disc from a satellite spot of light, wherein the satellite spot of light at least partially overlaps a track adjacent to the first track, and detect a modulation transition between the first track and the adjacent track by detecting a change in a level of the satellite signal.

The modulation transition may comprise a change from an unwritten region of the optical storage medium to a written region of the optical storage medium when the satellite signal changes from a high level to a low level and/or a change from a written region of the optical storage medium to an unwritten region of the optical storage medium when the satellite signal changes from a low level to a high level. In an exemplary embodiment, the controller may be further configured to demodulate a data signal from the main signal when the first track comprises a written region of the optical storage medium and demodulate a wobble signal from the main signal when the first track comprises an unwritten region of the optical storage medium. Thus, the controller may be configured to switch from demodulating the data signal to demodulating the wobble signal when the satellite signal changes from a low level to a high level and/or to switch from demodulating the wobble signal to demodulating the data signal when the satellite signal changes from a high level to a low level.

Further embodiments relate to an apparatus for reading an optical disc. The apparatus generally includes an optical assembly, one or more satellite photodetectors (e.g., photodiodes), and a controller. The optical assembly is generally configured to focus a first spot of light onto the optical disc, wherein the first spot is substantially centered on a first track of the optical disc, and focus a satellite spot of light onto an optical disc, wherein the satellite spot at least partially overlaps a track adjacent to the first track. The satellite photodetector(s) may be configured to detect light reflected from the optical disc from the satellite spot and generate a satellite detector signal. The controller is generally the controller described above (e.g., configured to detect a modulation transition between the first track and the adjacent track by detecting a change in a level of the satellite detector signal or a derivative thereof).

The optical assembly may be further configured to direct the reflected light from the optical disc from the satellite spot to the satellite photodetector(s). When more than one satellite photo detector is used, the controller may be configured to combine a plurality of satellite detector signals to produce a combined satellite detector signal (e.g., the combined satellite detector signal may comprise a sum or difference of the plurality of satellite detector signals).

In a further embodiment, the apparatus includes at least one main detector configured to detect light reflected from the optical disc from the first spot, and the controller may be further configured to demodulate a data signal from the main signal or a derivative thereof when the first track comprises a written region of the optical storage medium, and demodulating a wobble signal from the main signal when the first track comprises an unwritten region of the optical storage medium.

The algorithms, computer program(s) and/or software, implementable and/or executable in systems equipped with a general purpose microprocessor and/or a conventional digital signal processor, may be configured to perform one or more steps of the method and/or one or more operations of the hardware described herein. The architectures and/or systems generally comprise those that include one or more components embodying one or more of the inventive concepts disclosed herein.

Embodiments of the present invention advantageously provide for detecting a modulation transition between a main (current) track and an adjacent (next) track, so that demodulation of a signal from an optical storage medium can be smoothly switched from one mode to another.

These and other advantages of the present invention and/or its embodiments will become readily apparent from the detailed description of various embodiments below.

DETAILED DESCRIPTION

Figure 1:
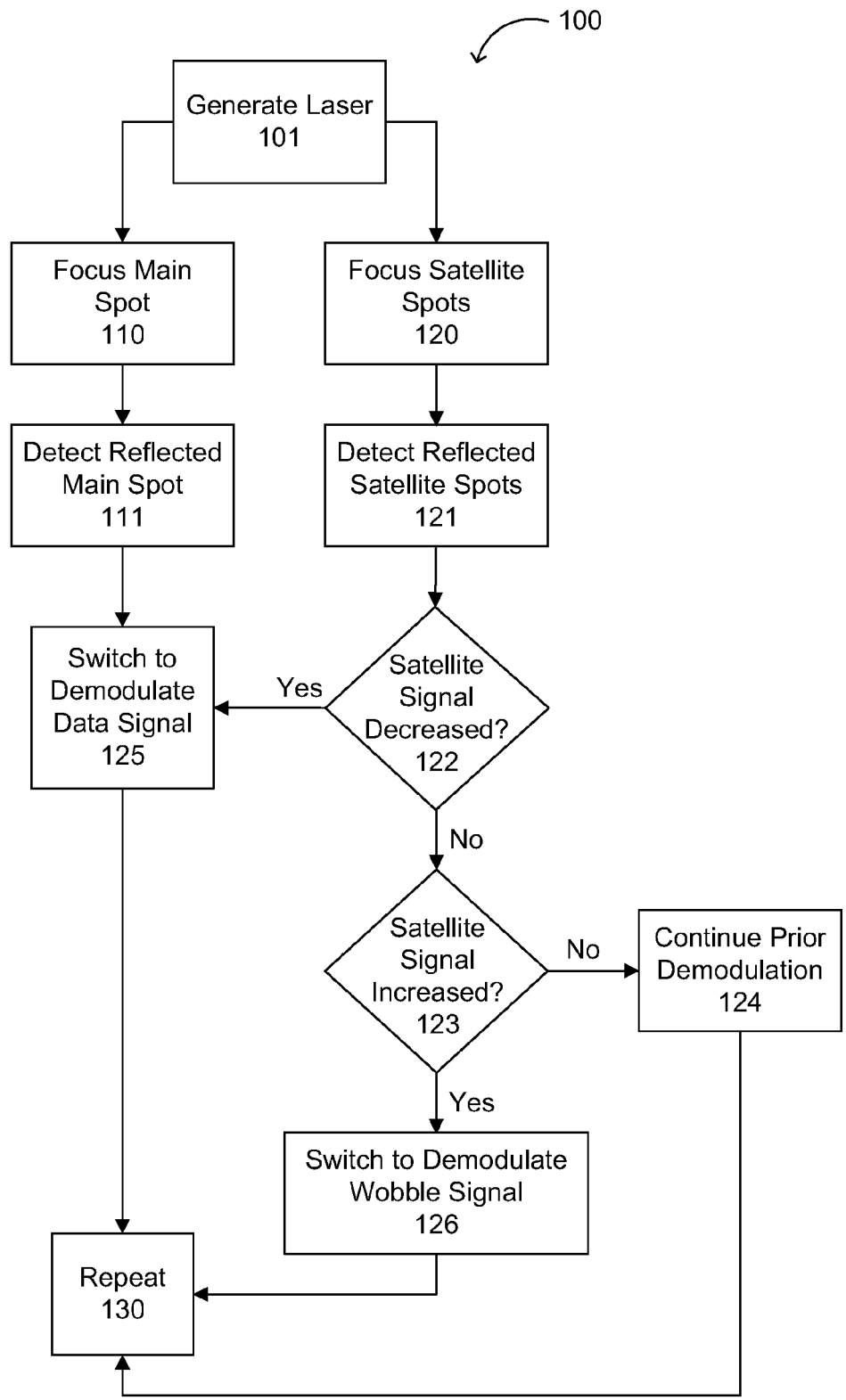
FIG. 1 is a diagram showing an embodiment of an exemplary method according to the present invention.

Reference will now be made in detail to the embodiments of the invention, examples of which are illustrated in the accompanying drawings. While the invention will be described in conjunction with the embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. Also, for convenience and simplicity, the terms "data," "data stream," "waveform," "signal," and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

Finally, while the term "track" may refer to a continuous or spiral pre-groove on an optical storage medium (e.g., an optical disc such as a CD, DVD, HD-DVD, BD, etc.), track may also refer to each 360 degree segment of the continuous pre-groove or each stored logical element or each logical track.

The invention, in its various aspects, will be explained in greater detail below with regard to exemplary embodiments.

An Exemplary Method

FIG. 1 shows a flow chart of an exemplary method of detecting and responding to a modulation transition between tracks of an optical disc. At step 101, one or more beams of light are produced. For example, step 101 may conventionally include a laser diode emitting a linearly polarized beam of light, which may be collimated by a collimator lens. The beam(s) may be divided into additional beams (e.g., by passing the beam through a grating) to be focused on different areas of the optical disc. At step 110, a first (or center) spot is focused onto an optical disc. The first spot is substantially centered on a first track of the optical disc. At step 120, a satellite spot of light is also focused onto the optical disc. The satellite spot at least partially overlaps a track adjacent to the first track.

Figure 2:
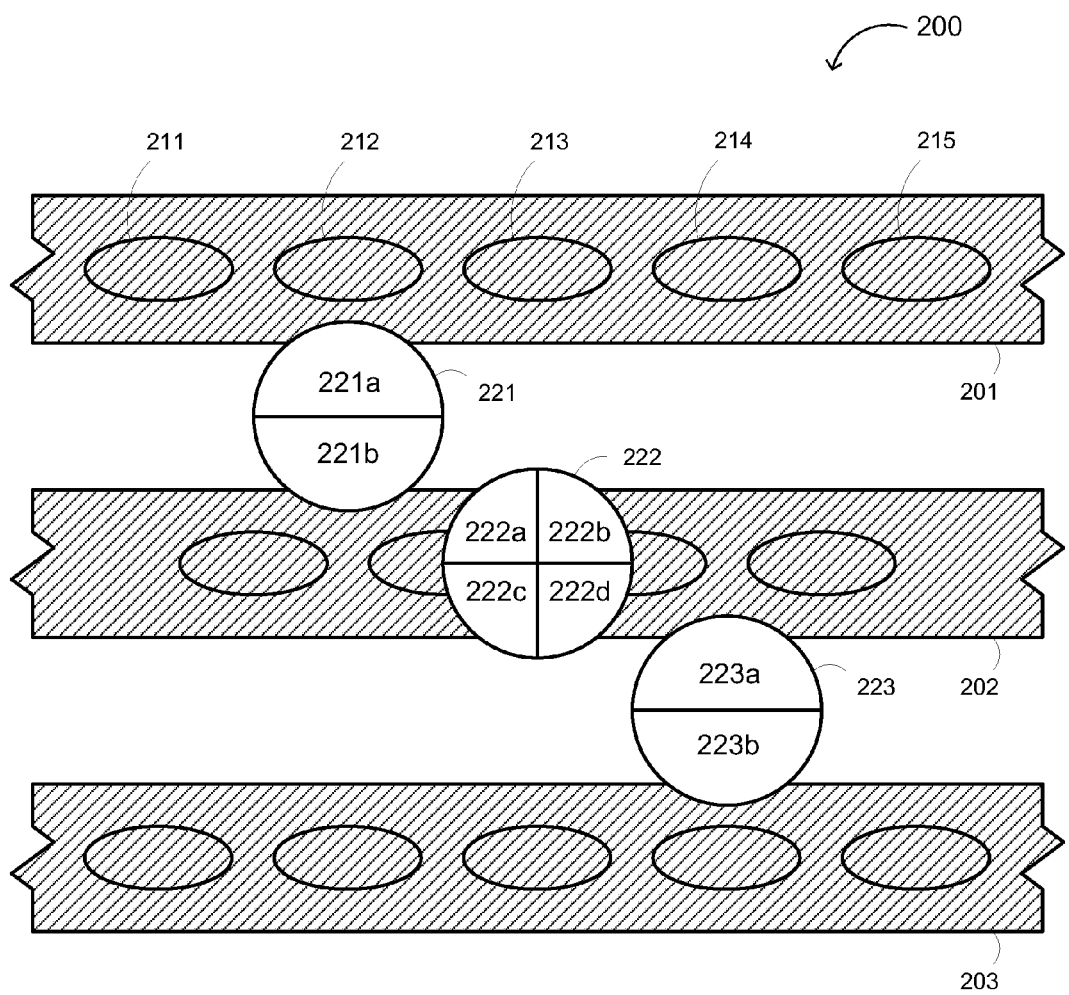
FIG. 2 is a diagram showing an arrangement of spots on adjacent tracks of an optical disc.

Referring now to FIG. 2, an arrangement of spot detectors on tracks of optical disc 200 is shown. Track 202 is a center track, and tracks, 201 and 203 are adjacent to center track 202. A single continuous or spiral pre-groove on an optical storage medium (e.g., an optical disc such as a CD, DVD, HD-DVD, BD, etc.) may comprise all three track segments 201, 202, and 203, though each may be considered a separate track from the perspective of an optical pickup unit travelling over the disc.

Center spot detector 222 is generally centered on track 202. Satellite spot detectors 221 and 223 may be conventionally used to keep center spot detector 222 centered on the current track. However, the level of light received by the satellite spots 221 and 223 may also be influenced by the modulation of the adjacent tracks 201 and 203. For example, when a track of a recordable optical storage medium has data written to it, the track generally reflects less light. Thus, if track 203 has data written on it, then satellite spot detector 223 will generally receive less light than if track 203 had no data written on it. As a result, in embodiments of the present invention the level of light detected in a satellite spot can be used to determine whether a modulation transition (e.g., from written to blank or black to written) has occurred between the current track (e.g., track 202) and a next adjacent track (e.g., track 203).

Referring again to FIG. 1, at step 121 the method includes generating a satellite signal from light reflected from the optical disc from the satellite spot. Generating the satellite signal may include detecting the light reflected from the optical discs from the satellite spot (e.g., using spot detector 223) and producing the satellite signal in response to the detecting. For example, detecting the light may comprise directing the reflected light to one or more satellite photodetectors (e.g., photodiodes). Generating the satellite signal may comprise combining signals from each of the satellite photodetectors. For example, spot detector 223 of FIG. 2 may include photodiodes 223a and 223b, and the satellite signal may comprise a sum or other combination of the output signals of photodiodes 223a and 223b.

Meanwhile, at step 111, a main signal may be generated by detecting a light reflected from the optical disc from the main spot (e.g., using spot detector 222). In steps 122-126, the method generally detects a modulation transition by detecting a change in a level of the satellite signal and demodulates the main signal in accordance with any modulation transition.

At step 122, it is determined whether the satellite signal (or a combination or other derivative thereof) decreases. A modulation transition generally comprises a change from an unwritten or blank region of the optical storage medium to a written region of the optical storage medium when the satellite signal changes from a high level to a low level (e.g., because less light is reflected from the adjacent track when it contains written data). While the track is blank, the system generally demodulates a wobble signal from the main signal. However, if a decrease in the satellite signal is detected, then at step 125 the method switches from demodulating the wobble signal to demodulating the data signal. For example, the method may include predicting a reflection change for the main spot detector and adapting gains in the servo path. After performing the switch, at step 130 the method is repeated to continue reading the disc.

Figure 3A:
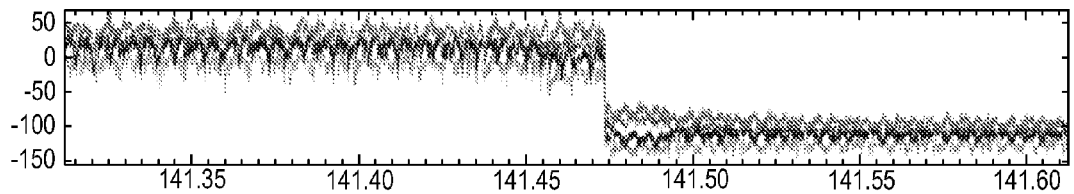
FIGS. 3A-3E are graphs of exemplary signal levels corresponding to light reflected from an optical disc and combinations thereof during a transition from blank portion of the optical disc to a written portion of the optical disc.
Figure 3B:
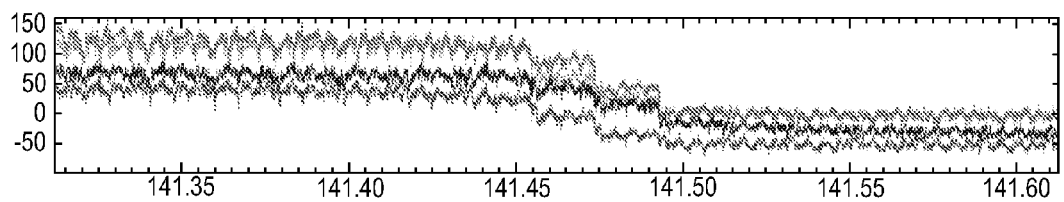
Figure 3C:
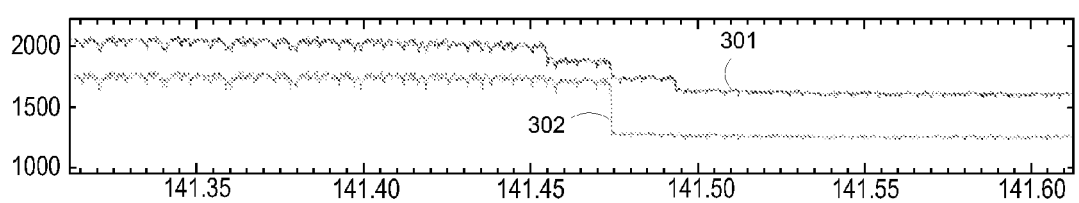
Figure 3D:
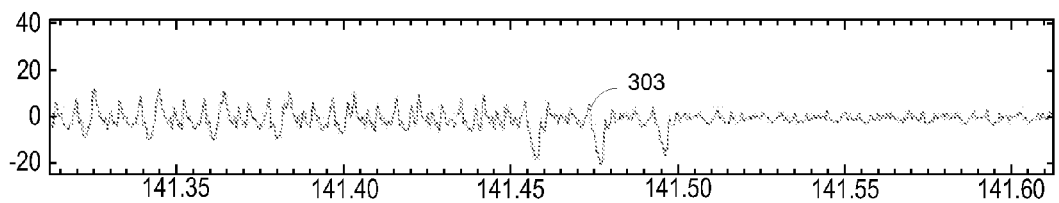
Figure 3E:
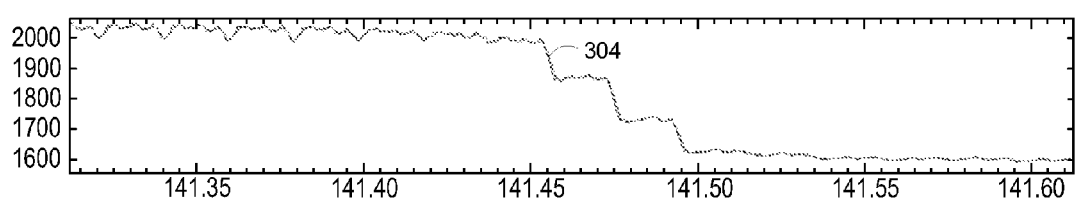

FIG. 3A shows a graph of exemplary output from photodiodes in a main spot detector (e.g., photodiodes 222a-222d of main spot detector 222 of FIG. 2). The level of the photodiode outputs abruptly drops at approximately time 141.47. FIG. 3B shows a graph of output from a satellite spot having four photodiodes. FIG. 3C shows a graph of a satellite sum 301 comprising a sum of the satellite photodiode outputs of FIG. 3B and a main sum 302 comprising a sum of the main photodiode outputs of FIG. 3A. Satellite sum 301 shows a drop in amplitude at approximately time 141.455, thus providing a warning that a modulation transition is about to occur (e.g., when the main beam reaches the next track where the satellite beam is positioned). FIG. 3D shows a graph of a trigger output 303 derived from changes in the satellite spot signal(s). FIG. 3E shows a graph of a filtered output 304 comprising a moving average of the satellite sum 301. The values of trigger output 303 and/or filtered output 304 may be used to determine when a modulation transition is about to occur.

At step 123, it is determined whether the satellite signal (or a combination or other derivative thereof) increases. A modulation transition generally comprises a change from a written region of the optical storage medium to an unwritten or blank region of the optical storage medium when the satellite signal changes from a low level to a high level (e.g., because more light is reflected from the adjacent track when it is blank). While the track contains written data, the system generally demodulates a data signal from the main signal. If an increase in the satellite signal is detected, then at step 126 the method switches from demodulating the data signal to demodulating the wobble signal. After performing the switch, at step 130 the method is repeated to continue reading the disc. It will be recognized that in low-to-high media (e.g., formats where the written regions have higher reflectivity than unwritten regions), steps 122 and 123 may be swapped.

Figure 4A:
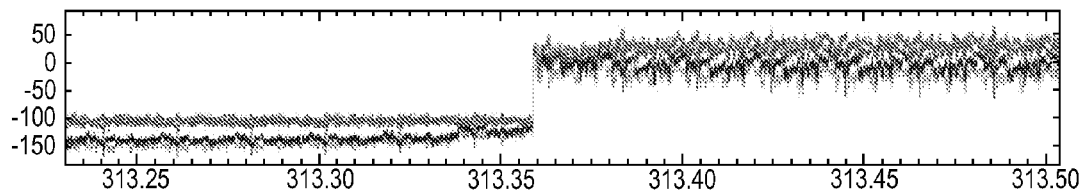
FIGS. 4A-4E are graphs of exemplary signal levels corresponding to light reflected from an optical disc and combinations thereof during a transition from written portion of the optical disc to a blank portion of the optical disc.
Figure 4B:
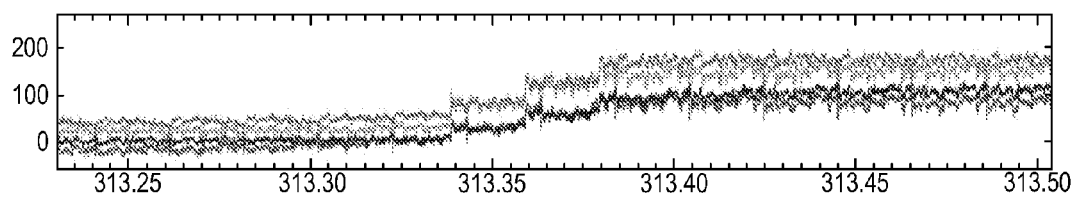
Figure 4C:
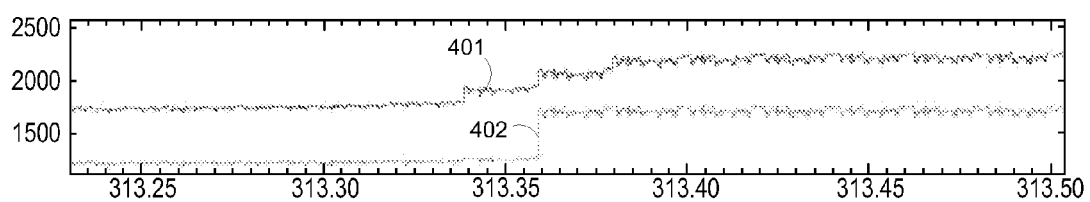
Figure 4D:
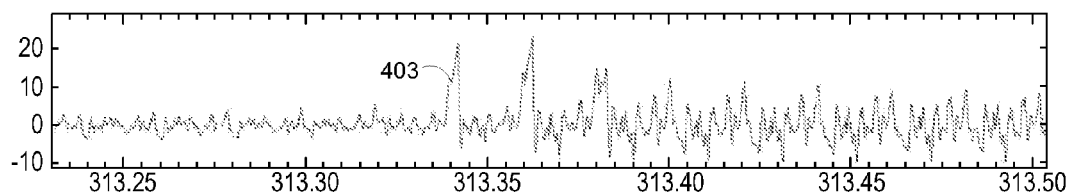
Figure 4E:
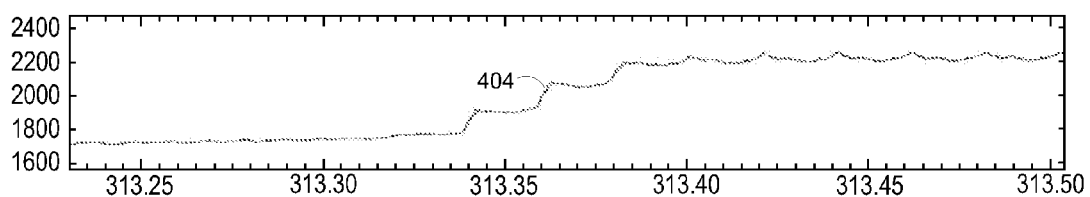

FIG. 4A, similar to FIG. 3A, shows a graph of exemplary output from photodiodes in a main spot detector. The level of the photodiode outputs abruptly rises at approximately time 313.36, indicating that a modulation transition from a written portion of the disc to a blank portion of the disc. FIG. 4B shows a graph of output from a satellite spot having four photodiodes. FIG. 4C shows a graph of a satellite sum 401 comprising a sum of the satellite photodiode outputs of FIG. 4B and a main sum 402 comprising a sum of the main photodiode outputs of FIG. 4A. Satellite sum 401 shows an increase in amplitude at approximately time 313.34, thus providing a warning that a modulation transition is about to occur (e.g., when the main beam reaches the next track where the satellite beam is positioned). FIG. 4D shows a graph of a trigger output 403 derived from changes in the satellite spot signal(s). FIG. 4E shows a graph of a filtered output 404 comprising a moving average of the satellite sum 401. As with trigger output 304 and filtered output 304 in FIGS. 3D and 3E, the values of trigger output 403 and/or filtered output 404 may be used to determine when a modulation transition is about to occur.

A person skilled in the art will be able to select an appropriate combination, filtering, or other manipulation of satellite photodetector outputs to determine when a signal transition is about to occur. When no transition occurs, at step 124 to continue the current demodulation, and at step 130 the method is repeated to continue reading the disc.

An Exemplary Controller and Apparatus

Figure 5:
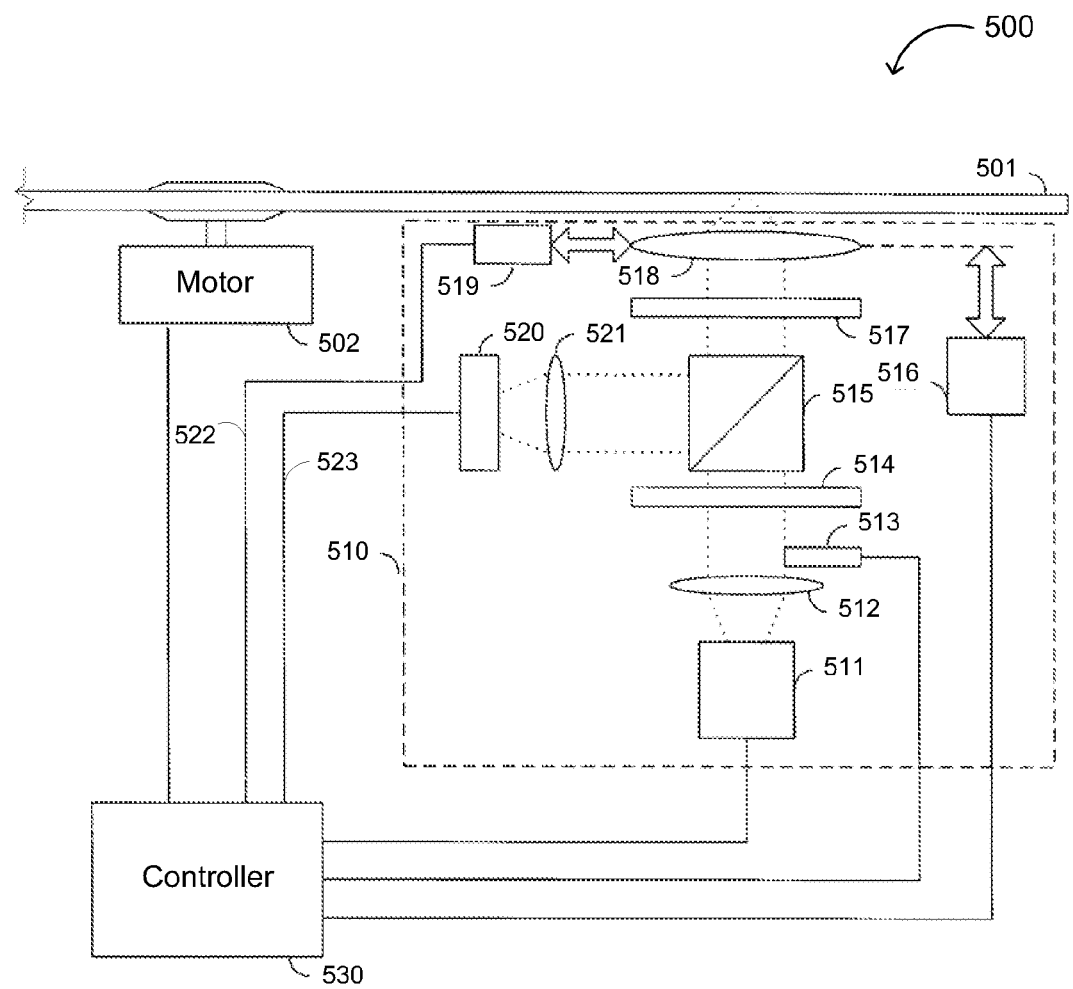
FIG. 5 is a diagram showing an exemplary apparatus for reading an optical disc.

FIG. 5 shows an exemplary apparatus 500 for reading from and/or writing to an optical disc 501. The apparatus 500 may include a motor 502 for rotating the disc 501, controller 530, and an optical assembly 510. A laser diode 511 emits a linearly polarized beam of light which is collimated by a collimator lens 512. The collimated light passes through a grating 514, which divides the light beam into three beams: a center beam, and two satellite beams. The three light beams pass through a polarization beam splitter 515, and focused by a lens 518 onto a recording layer of the optical disc 501.

A portion of the light is reflected by the optical disc 501 and returns through the objective lens 518 and passed to photodetector assembly 520. Photodetector assembly 520 may include main beam detectors (e.g., photodiodes 222a-222b of FIG. 2) and/or satellite beam detectors (e.g., photodiodes 221a, 221b, 223a, and 223b. The optical assembly 510 is generally configured to focus a first spot of light onto the optical disc, wherein the first spot is substantially centered on a first track of the optical disc, and focus a satellite spot of light onto an optical disc, wherein the satellite spot at least partially overlaps a track adjacent to the first track. The satellite photodetector(s) may be configured to detect light reflected from the optical disc from the satellite spot and generate a satellite detector signal.

Controller 530 may comprise a general purpose microprocessor, SOC, and/or ASIC. The controller 530 is generally configured to receive a main signal, wherein the main signal generated from light reflected from an optical disc from a first spot a first spot of light, wherein the first spot is substantially centered on a first track of the optical disc, receive a satellite signal, wherein the satellite signal is generated from light reflected from the optical disc from a satellite spot of light, wherein the satellite spot of light at least partially overlaps a track adjacent to the first track, and detect a modulation transition between the first track and the adjacent track by detecting a change in a level of the satellite signal.

As described with respect to the methods above, the modulation transition may comprise a change from an unwritten region of the optical storage medium to a written region of the optical storage medium when the satellite signal changes from a low level to a high level and/or a change from a written region of the optical storage medium to an unwritten region of the optical storage medium when the satellite signal changes from a high level to a low level. Controller 530 is generally configured to demodulate a data signal from the main signal when the first track comprises a written region of the optical storage medium and to demodulate a wobble signal from the main signal when the first track comprises an unwritten region of the optical storage medium Controller 530 may also be configured to switch from demodulating the data signal to demodulating the wobble signal when the satellite signal changes from a low level to a high level and/or to switch from demodulating the wobble signal to demodulating the data signal when the satellite signal changes from a high level to a low level.

When more than one satellite photo detector is used, controller 530 may be configured to combine a plurality of satellite detector signals to produce a combined satellite detector signal (e.g., the combined satellite detector signal may comprise a sum or difference of the plurality of satellite detector signals).

Detector assembly 520 generally includes at least one main detector configured to detect light reflected from the optical disc 501 from the first spot, and the controller may be further configured to demodulate a data signal from the main signal or a derivative thereof when the first track comprises a written region of the optical storage medium, and demodulating a wobble signal from the main signal when the first track comprises an unwritten region of the optical storage medium.

Exemplary Architectures and/or Systems

In a further aspect of the invention, the architectures and/or systems generally comprise those that include one or more components embodying one or more of the inventive concepts disclosed herein. For example, the architectures and/or systems may include optical storage devices (e.g., devices for reading CD, DVD, HD-DVD, and/or BD media) according to the present invention.

Figure 6A:
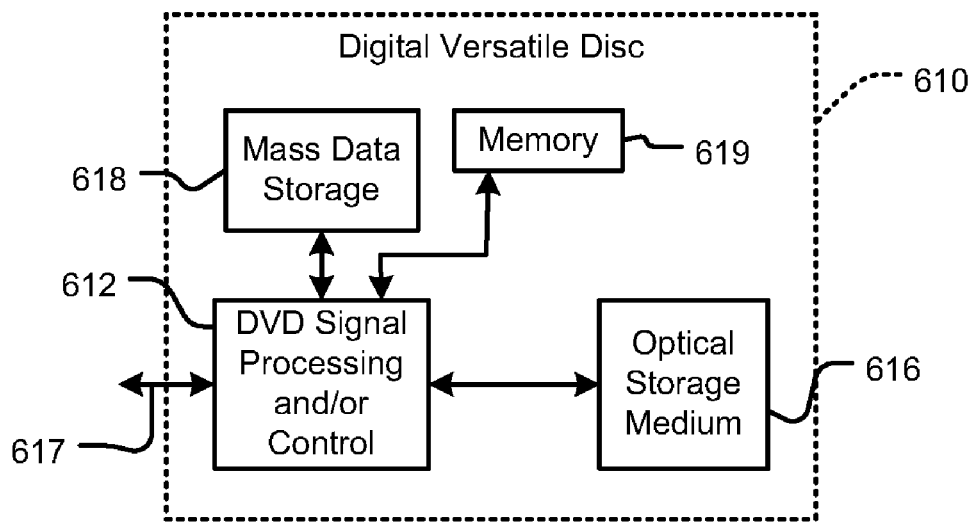
FIGS. 6A-6F are diagrams showing exemplary systems in which the present invention may be used.

Various exemplary implementations of the present invention are shown in FIGS. 6A-6F. Referring now to FIG. 6A, the embodiments of the present invention can be implemented in a digital versatile disc (DVD) drive 610. The embodiments of the present invention may implement either or both signal processing and/or control circuits, which are generally identified in FIG. 6A at 612. The signal processing and/or control circuit 612 and/or other circuits (not shown) in the DVD 610 may process data, perform coding and/or encryption, perform calculations, and/or format data that is read from and/or data written to an optical storage medium 616. In some implementations, the signal processing and/or control circuit 612 and/or other circuits (not shown) in the DVD 610 can also perform other functions such as encoding and/or decoding and/or any other signal processing functions associated with a DVD drive.

The DVD drive 610 may communicate with an output device (not shown) such as a computer, television or other device via one or more wired or wireless communication links 617. The DVD 610 may communicate with mass data storage 618 that stores data in a nonvolatile manner. The mass data storage 618 may include a hard disk drive (HDD). The HDD may be a mini HDD that includes one or more platters having a diameter that is smaller than approximately 1.8". The DVD 610 may be connected to memory 619 such as RAM, ROM, nonvolatile memory such as flash memory and/or other suitable electronic data storage.

Figure 6B:
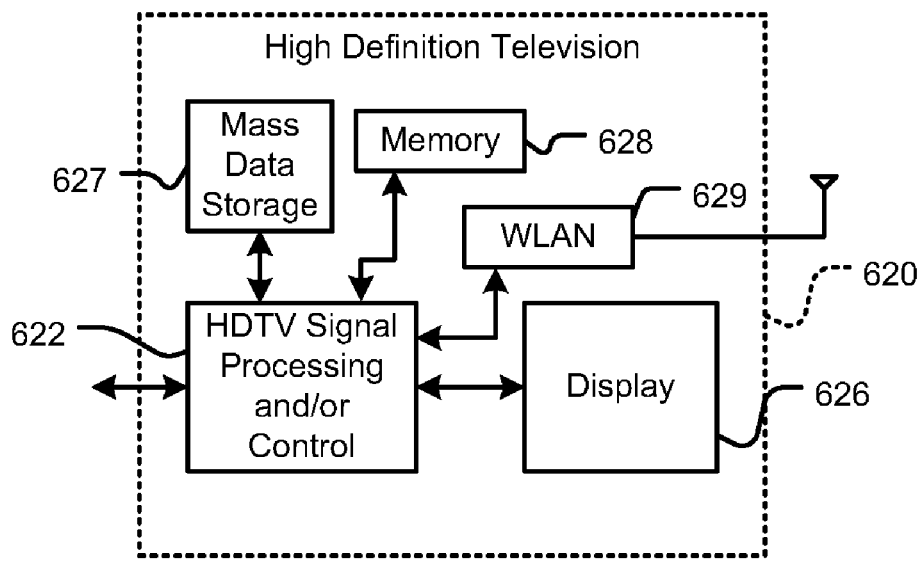

Referring now to FIG. 6B, the embodiments of the present invention can be implemented in a high definition television (HDTV) 620. The embodiments of the present invention may implement mass data storage 627 of the HDTV 620. The HDTV 620 receives HDTV input signals in either a wired or wireless format and generates HDTV output signals for a display 626. In some implementations, signal processing circuit and/or control circuit 622 and/or other circuits (not shown) of the HDTV 620 may process data, perform coding and/or encryption, perform calculations, format data and/or perform any other type of HDTV processing that may be required.

The HDTV 620 may communicate with mass data storage 627 that stores data in a nonvolatile manner such as optical and/or magnetic storage devices. At least one DVD may have the configuration shown in FIG. 6A. The HDD may be a mini HDD that includes one or more platters having a diameter that is smaller than approximately 1.8". The HDTV 620 may be connected to memory 628 such as RAM, ROM, nonvolatile memory such as flash memory and/or other suitable electronic data storage. The HDTV 620 also may support connections with a WLAN via a WLAN network interface 629.

Figure 6C:
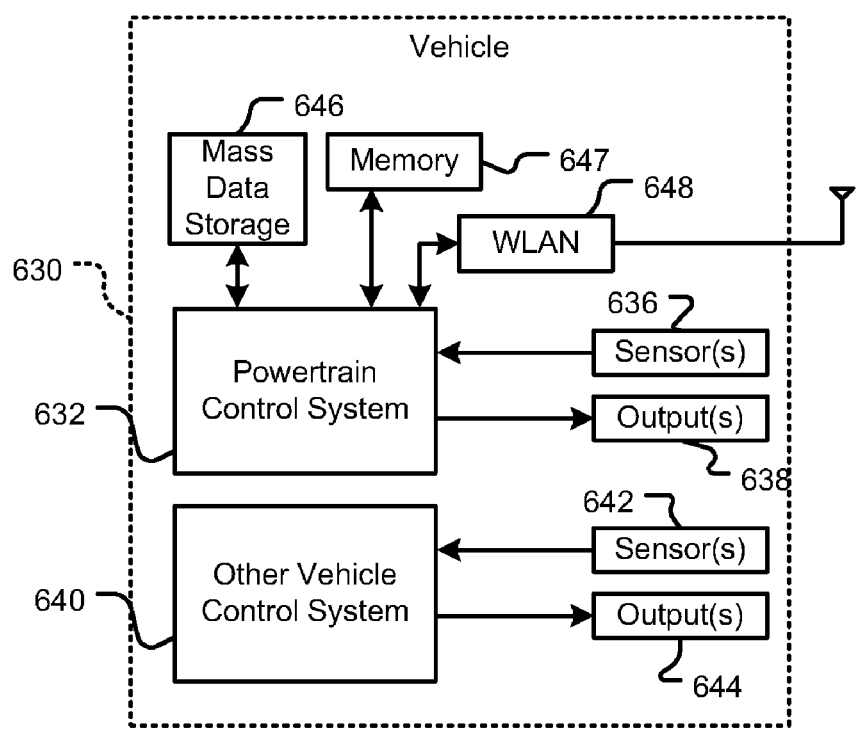

Referring now to FIG. 6C, the embodiments of the present invention may implement mass data storage 646 of the vehicle control system. In some implementations, the embodiments of the present invention implement a powertrain control system 632 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The embodiments of the present invention may also be implemented in other control systems 640 of the vehicle 630. The control system 640 may likewise receive signals from input sensors 642 and/or output control signals to one or more output devices 644. In some implementations, the control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 632 may communicate with mass data storage 646 that stores data in a nonvolatile manner. The mass data storage 646 may include optical and/or magnetic storage devices (for example, hard disk drives [HDDs] and/or DVDs). At least one DVD may have the configuration shown in FIG. 6A. The HDD may be a mini HDD that includes one or more platters having a diameter that is smaller than approximately 1.8". The powertrain control system 632 may be connected to memory 647 such as RAM, ROM, nonvolatile memory such as flash memory and/or other suitable electronic data storage. The powertrain control system 632 also may support connections with a WLAN via a WLAN network interface 648. The control system 640 may also include mass data storage, memory and/or a WLAN interface (all not shown).

Figure 6D:
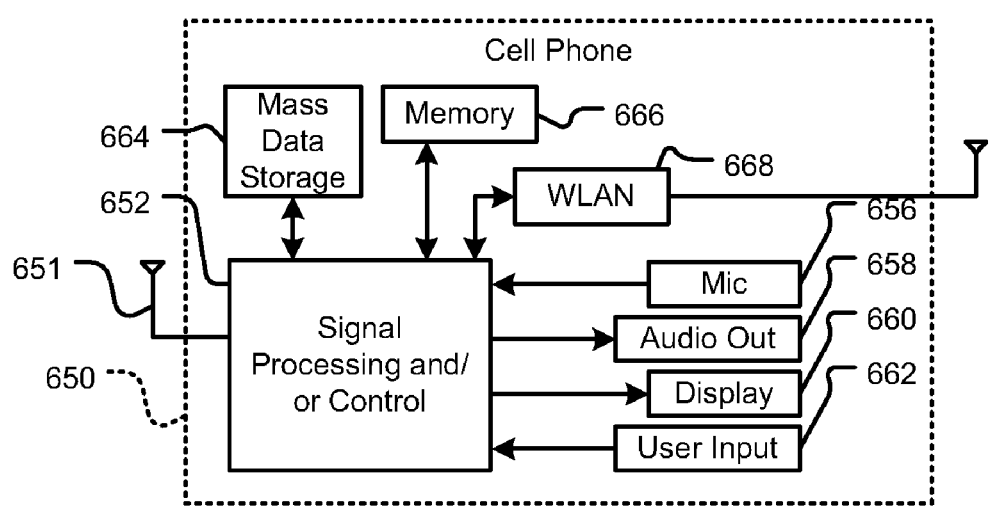

Referring now to FIG. 6D, the embodiments of the present invention can be implemented in a cellular phone 650 that may include a cellular antenna 651. The embodiments of the present invention may implement mass data storage 664 of the cellular phone 650. In some implementations, the cellular phone 650 includes a microphone 656, an audio output 658 such as a speaker and/or audio output jack, a display 660 and/or an input device 662 such as a keypad, pointing device, voice actuation and/or other input device. The signal processing and/or control circuits 652 and/or other circuits (not shown) in the cellular phone 650 may process data, perform coding and/or encryption, perform calculations, format data and/or perform other cellular phone functions.

The cellular phone 650 may communicate with mass data storage 664 that stores data in a nonvolatile manner such as optical and/or magnetic storage devices (for example, hard disk drives [HDDs] and/or DVDs). At least one DVD may have the configuration shown in FIG. 6A. The HDD may be a mini HDD that includes one or more platters having a diameter that is smaller than approximately 1.8". The cellular phone 650 may be connected to memory 666 such as RAM, ROM, nonvolatile memory such as flash memory and/or other suitable electronic data storage. The cellular phone 650 also may support connections with a WLAN via a WLAN network interface 668.

Figure 6E:
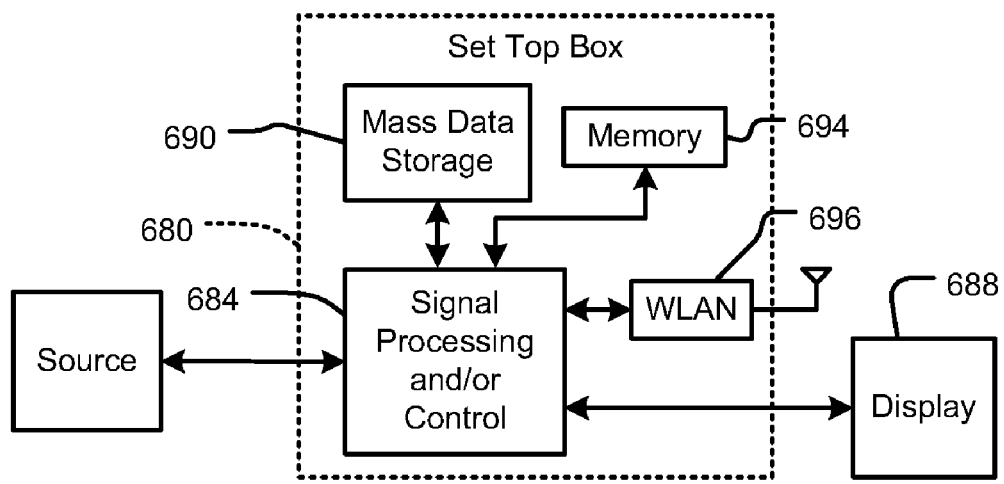

Referring now to FIG. 6E, the embodiments of the present invention can be implemented in a set top box 680. The embodiments of the present invention may implement mass data storage 690 of the set top box 680. The set top box 680 receives signals from a source such as a broadband source and outputs standard and/or high definition audio/video signals suitable for a display 688 such as a television and/or monitor and/or other video and/or audio output devices. The signal processing and/or control circuits 684 and/or other circuits (not shown) of the set top box 680 may process data, perform coding and/or encryption, perform calculations, format data and/or perform any other set top box function.

The set top box 680 may communicate with mass data storage 690 that stores data in a nonvolatile manner. The mass data storage 690 may include optical and/or magnetic storage devices (for example, hard disk drives [HDDs] and/or DVDs). At least one DVD may have the configuration shown in FIG. 6A. The HDD may be a mini HDD that includes one or more platters having a diameter that is smaller than approximately 1.8". The set top box 680 may be connected to memory 694 such as RAM, ROM, nonvolatile memory such as flash memory and/or other suitable electronic data storage. The set top box 680 also may support connections with a WLAN via a WLAN network interface 696.

Figure 6F:
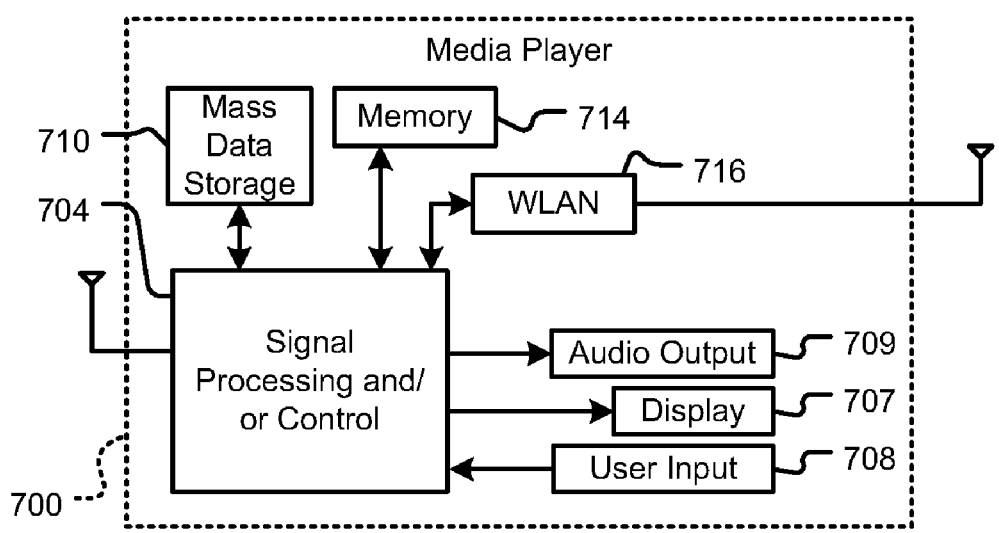

Referring now to FIG. 6F, the embodiments of the present invention can be implemented in a media player 700. The embodiments of the present invention may implement mass data storage 710 of the media player 700. In some implementations, the media player 700 includes a display 707 and/or a user input 708 such as a keypad, touchpad and the like. In some implementations, the media player 700 may employ a graphical user interface (GUI) that typically employs menus, drop down menus, icons and/or a point-and-click interface via the display 707 and/or user input 708. The media player 700 further includes an audio output 709 such as a speaker and/or audio output jack. The signal processing and/or control circuits 704 and/or other circuits (not shown) of the media player 700 may process data, perform coding and/or encryption, perform calculations, format data and/or perform any other media player function.

The media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices (for example, hard disk drives [HDDs] and/or DVDs). At least one DVD may have the configuration shown in FIG. 6A. The HDD may be a mini HDD that includes one or more platters having a diameter that is smaller than approximately 1.8". The media player 700 may be connected to memory 714 such as RAM, ROM, nonvolatile memory such as flash memory and/or other suitable electronic data storage. The media player 700 also may support connections with a WLAN via a WLAN network interface 716. Still other implementations in addition to those described above are contemplated.

EXEMPLARY SOFTWARE

The present invention also includes algorithms, computer program(s) and/or software, implementable and/or executable in a general purpose computer or workstation equipped with a conventional digital signal processor, configured to perform one or more steps of the method and/or one or more operations of the hardware. Thus, a further aspect of the invention relates to algorithms and/or software that implement the above method(s). For example, the invention may further relate to a computer program, computer-readable medium or waveform containing a set of instructions which, when executed by an appropriate processing device (e.g., a signal processing device, such as a microcontroller, microprocessor or DSP device), is configured to perform the above-described method and/or algorithm.

For example, the computer program may be on any kind of readable medium, and the computer-readable medium may comprise any medium that can be read by a processing device configured to read the medium and execute code stored thereon or therein, such as a floppy disk, CD-ROM, magnetic tape or hard disk drive. Such code may comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device or application-specific [integrated] circuit).

In various embodiments, the computer-readable medium or waveform comprises at least one instruction to receive a main signal, wherein the main signal generated from light reflected from an optical disc from a first spot a first spot of light, wherein the first spot is substantially centered on a first track of the optical disc, receive a satellite signal, wherein the satellite signal is generated from light reflected from the optical disc from a satellite spot of light, wherein the satellite spot of light at least partially overlaps a track adjacent to the first track, and detect a modulation transition between the first track and the adjacent track by detecting a change in a level of the satellite signal.

CONCLUSION/SUMMARY

Thus, the embodiments of the present invention provide a circuits, architectures, systems, methods, software, and algorithms for detecting a modulation transition (e.g., a change from a written portion containing RF-modulated data to an unwritten portion containing only a wobble signal modulation) on an optical storage medium. The embodiments of the present invention advantageously provide for detecting a modulation transition between a main (current) track and an adjacent (next) track, so that demodulation of a signal from an optical storage medium can be smoothly switched from one mode to another.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
   focusing a first spot of light onto an optical storage medium, wherein said first spot of light is substantially centered on a first track of said optical storage medium;
   focusing a satellite spot of light onto said optical storage medium, wherein said satellite spot of light at least partially overlaps a track adjacent to said first track of the optical storage medium;
   generating a satellite signal from light reflected from said optical storage medium from said satellite spot of light;
   generating a satellite sum signal by summing up a plurality of satellite signals;
   predicting that a modulation transition between said first track and said track adjacent to said first track is about to occur by detecting a change in the satellite sum signal; and
   controlling a demodulation mode of a signal from the optical storage medium based on the prediction, the demodulation mode being one of data signal demodulation and wobble signal demodulation.

2. The method of claim 1, wherein generating said satellite signal comprises:
   detecting said light reflected from said optical storage medium from said satellite spot of light; and
   producing said satellite signal in response to said detecting.

3. The method of claim 2, wherein detecting said light comprises directing said light reflected to one or more photodetectors.

4. The method of claim 3, wherein said one or more photodetectors comprises a plurality of said photodetectors, and generating said satellite signal comprises combining signals from each of said photodetectors.

5. The method of claim 1, wherein said modulation transition comprises a change from an unwritten region of said optical storage medium to a written region of said optical storage medium when said satellite signal changes from a high level to a low level.

6. The method of claim 1, wherein said modulation transition comprises a change from a written region of said optical storage medium to an unwritten region of said optical storage medium when said satellite signal changes from a low level to a high level.

7. The method of claim 1, further comprising:
   generating a main signal from light reflected from said optical storage medium from said first spot,
   demodulating a data signal from said main signal when said track comprises a written region of said optical storage medium, and
   demodulating a wobble signal from said main signal when said track comprises an unwritten region of said optical storage medium.

8. The method of claim 7, further comprising switching from demodulating said data signal to demodulating said wobble signal when said satellite signal changes from a low level to a high level.

9. The method of claim 7, further comprising switching from demodulating said wobble signal to demodulating said data signal when said satellite signal changes from a high level to a low level.

10. A controller in an optical storage medium, said controller configured to:
   receive a main signal, wherein said main signal is generated from light reflected from said optical storage medium from a first spot of light, wherein said first spot of light is substantially centered on a first track;
   receive a satellite signal, wherein said satellite signal is generated from light reflected from said optical storage medium from a satellite spot of light, wherein said satellite spot of light at least partially overlaps a track adjacent to said first track of the optical storage medium;
   generate a satellite sum signal by summing up a plurality of satellite signals;
   predict that a modulation transition between said first track and said track adjacent to said first track is about to occur by detecting a change in the satellite sum signal; and
   control a demodulation mode of a signal from said optical storage device based on the prediction, the demodulation mode being one of data signal demodulation and wobble signal demodulation.

11. The controller of claim 10, wherein said modulation transition comprises a change from an unwritten region of said optical storage medium to a written region of said optical storage medium when said satellite signal substantially decreases.

12. The controller of claim 10, wherein said modulation transition comprises a change from a written region of said optical storage medium to an unwritten region of said optical storage medium when said satellite signal substantially increases.

13. The controller of claim 10, further configured to demodulate a data signal from said main signal when said first track comprises a written region of said optical storage medium and demodulate a wobble signal from said main signal when said first track comprises an unwritten region of said optical storage medium.

14. The controller of claim 13, further configured to switch from demodulating said data signal to demodulating said wobble signal when said satellite signal substantially increases.

15. The controller of claim 13, further configured to switch from demodulating said wobble signal to demodulating said data signal when said satellite signal substantially decreases.

16. An apparatus for reading an optical storage medium, said apparatus comprising:
   an optical assembly configured to
      focus a first spot of light onto said optical storage medium, wherein said first spot of light is substantially centered on a first track of said optical storage medium, and
      focus a satellite spot of light onto said optical storage medium, wherein said satellite spot of light at least partially overlaps a track adjacent to said first track of said optical storage medium;
   at least one photodetector configured to detect light reflected from said optical storage medium from said satellite spot and generate a satellite detector signal; and
   a controller configured to generate a satellite sum signal by summing up a plurality of the satellite detector signals and predict that a modulation transition between said first track and said track adjacent to said first track is about to occur based on detecting a change in a level of the satellite sum signal, the controller further configured to control a demodulation mode of a signal from the optical storage medium based on the prediction, the demodulation mode being one of data signal demodulation and wobble signal demodulation.

17. The apparatus of claim 16, wherein said optical assembly is further configured to direct said light reflected from said optical storage medium from said satellite spot of light to said at least one photodetector.

18. The apparatus of claim 16, wherein said at least one photodetector comprises at least one photodiode.

19. The apparatus of claim 16, wherein said controller is further configured to combine a plurality of satellite detector signals to produce a combined satellite detector signal.

20. The apparatus of claim 19, wherein said combined satellite detector signal comprises a sum of said plurality of satellite detector signals.

21. The apparatus of claim 20, wherein said controller is further configured to detect a change from an unwritten region of said optical storage medium to a written region of said optical storage medium when said combined satellite detector signal substantially decreases.

22. The apparatus of claim 19, wherein said controller is further configured to detect a change from a written region of said optical storage medium to an unwritten region of said optical storage medium when said combined satellite detector signal substantially increases.

23. The apparatus of claim 16, further comprising at least one main detector configured to detect light reflected from said optical storage medium from said first spot of light, and wherein said controller is further configured to:
   demodulate a data signal based on a main signal when said first track comprises a written region of said optical storage medium, and
   demodulate a wobble signal from said main signal when said first track comprises an unwritten region of said optical storage medium.

24. The apparatus of claim 23, wherein said controller is further configured to:
   switch from demodulating said data signal to demodulating said wobble signal when said detector signal or a derivative thereof substantially increases; and
   switch from demodulating said wobble signal to demodulating said data signal when said satellite detector signal or a derivative thereof substantially decreases.

* * * * *